March 10, 1959 P. R. MARZAN 2,877,297

FACSIMILE RECORDING SYSTEM

Filed Nov. 10, 1953 2 Sheets-Sheet 1

INVENTOR
P. R. MARZAN
BY E. R. Evans
his ATTORNEY

March 10, 1959 P. R. MARZAN 2,877,297

FACSIMILE RECORDING SYSTEM

Filed Nov. 10, 1953 2 Sheets-Sheet 2

INVENTOR
P. R. MARZAN
BY E. R. Evans
his ATTORNEY

United States Patent Office 2,877,297

Patented Mar. 10, 1959

2,877,297

FACSIMILE RECORDING SYSTEM

Peter R. Marzan, New York, N. Y., assignor to Times Facsimile Corporation, New York, N. Y., a corporation of New York Application November 10, 1953, Serial No. 391,195

8 Claims. (Cl. 178—6.6)

This invention relates to a gain control system for a facsimile recorder responsive to modulated carrier signals.

An object of the present invention is to provide an improved automatic gain control system for a facsimile recorder operating on marking and spacing signals of varying duration, as for example are used in message or black-and-white transmission as distinguished from telephoto transmission.

For optimum recording it is often necessary to compensate for changes in the input level to the recorder. If a conventional automatic gain control amplifier is used, it is evident that when the signal level changes from maximum signal (black) to a long interval of minimum signal (white), the gain of the amplifier will slowly increase, depending upon the time constant, until its output is the same as it was with the maximum signal. This means that during a long interval of minimum signal (white), the signal will be eventually printed as black. If the time constant is made extremely long to slow the rate of increase of gain of the amplifier and thereby increase the interval of minimum signal that will eventually be printed as black, the compensation rate for changes in the maximum signal is decreased. Therefore the gain of the amplifier will not follow the changes in the maximum signal amplitude within a reasonable time.

Accordingly it is an object of the present invention to provide improved recording means embodying an automatic gain control system operating on the received signal level but which will not print the minimum signal regardless of its duration.

Another object of the invention is to provide automatic gain control means for a facsimile recorder operating to maintain the peak signal at a predetermined level and which will not print on the minimum signal amplitude regardless of its duration.

Still another object of the invention is to provide an improved system for compensating for changes in the signal level applied to a facsimile recorder while receiving picture signals.

Figure 1:
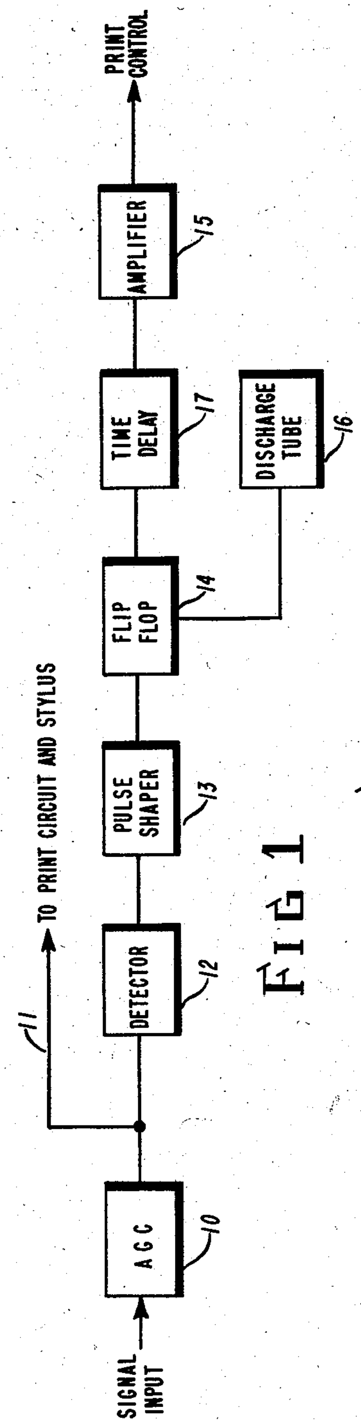
Figure 2:
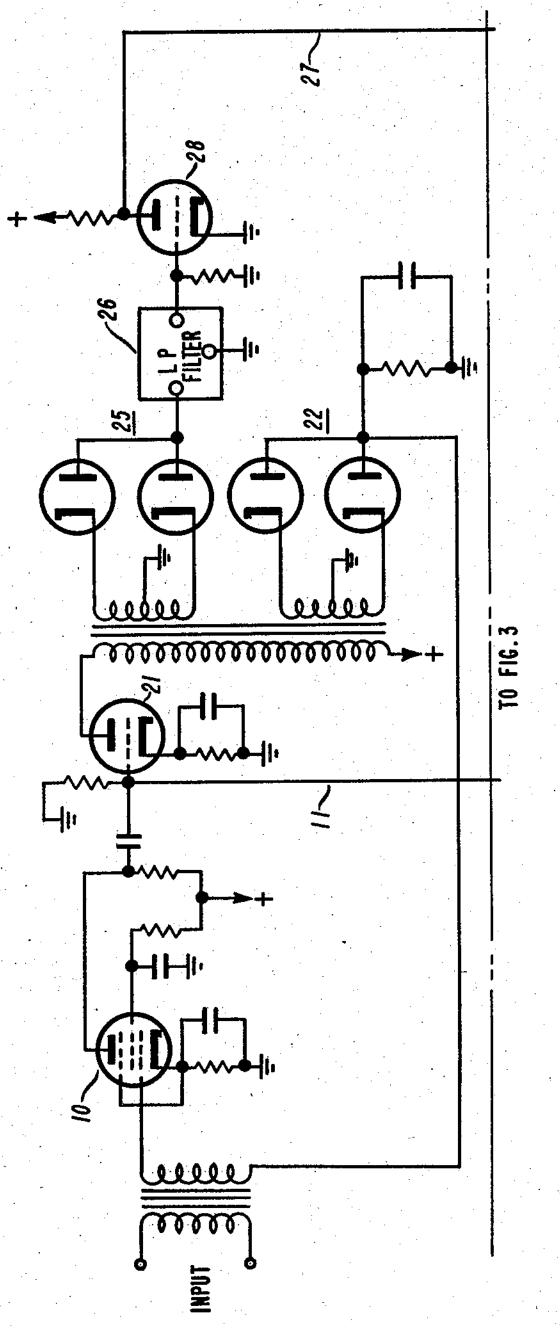
Figure 3:
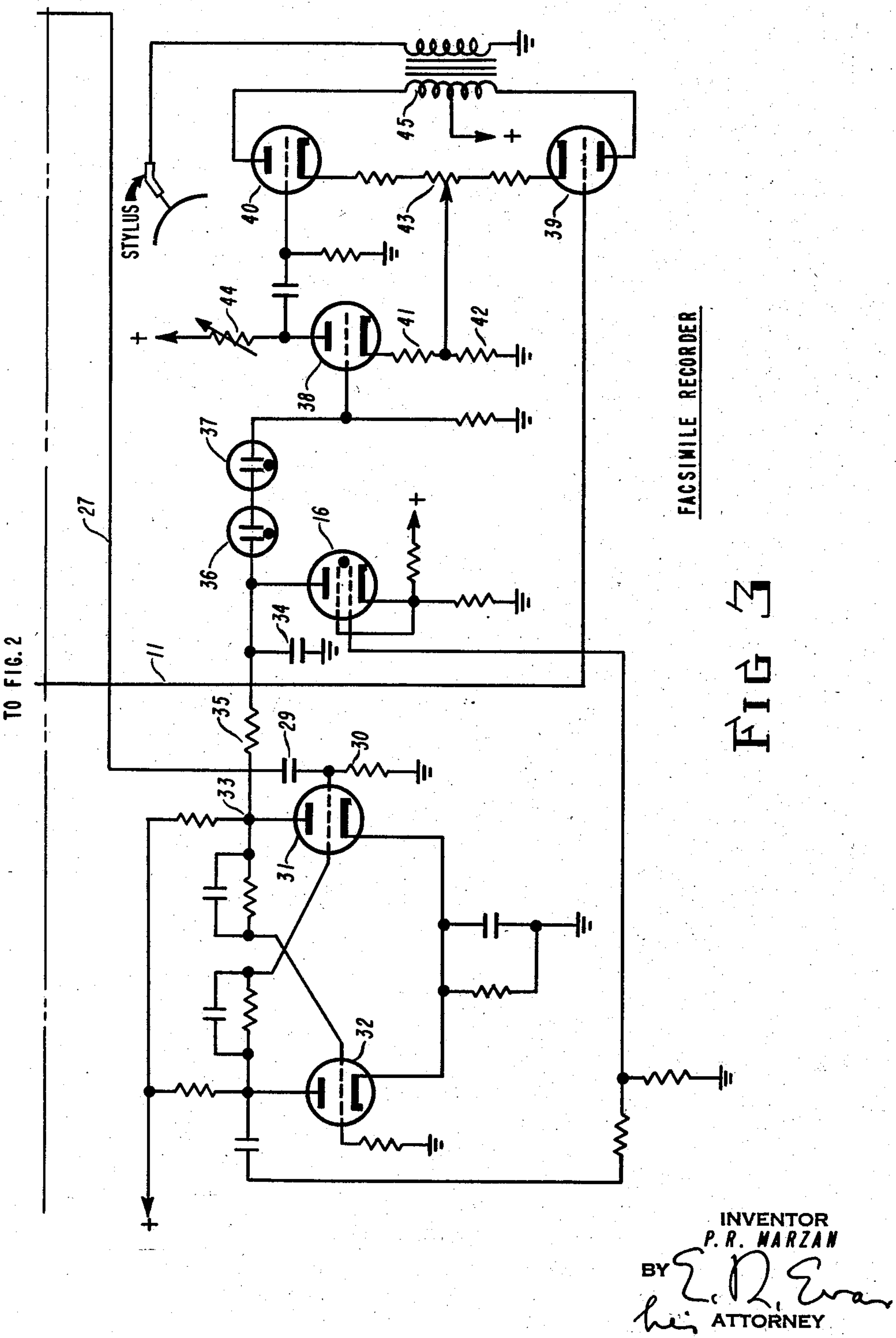

Other objects and advantages of the invention will become apparent from the following description of the preferred embodiment thereof shown in the accompanying drawings, in which Fig. 1 is a block diagram of a preferred embodiment of the invention; and Figs. 2 and 3 taken together constitute a detailed circuit diagram of the embodiment of the system shown in Fig. 1.

Referring to Fig. 1, in which is shown a block diagram of an automatic gain control system embodying the invention, the facsimile signal input from a wire circuit or radio channel is impressed upon a conventional automatic gain control system 10. The output of the automatic gain control system is applied through conductor 11 to the print or recording circuit of the facsimile recorder. The print circuit is controlled however by the print control means embodying the invention, as will be described hereinafter.

The output of the automatic gain control means consists of a modulated signal varying between maximum and minimum values, i. e., a square-topped wave. The modulation signal in the preferred embodiment of the invention shown is detected or rectified and then differentiated so that positive pips of current, for example, correspond to the transition from white or minimum signal (or no signal) to black or maximum signal, and negative pips to the transition from black to white. The pips control the two steady states of a flip-flop (Eccles-Jordan) circuit. The output of the flip-flop circuit is applied to an amplifier which controls the output of the automatic gain control system or the recorder print circuit to disable the circuit when the minimum is received and until the black or maximum signal is again received. In this manner the facsimile recorder is prevented from recording minimum signal as a result of the increase in amplification in the AGC system, while the desired compensation for changes in the level of the maximum signal is obtained.

As shown in Fig. 1, the output of the automatic gain control system 10 is impressed upon a detector 12 and the rectified signal is applied to the differentiator and pulse shaper circuit 13. The circuit 13 is arranged to generate positive and negative pips during the transition from white to black or black to white signals respectively. The two steady state conditions of a flip-flop or Eccles-Jordan circuit 14 are controlled by the positive or negative pips respectively. The negative pips occurring on the transition from maximum to minimum signal are employed to control or disable the print circuit through an amplifier 15. The print or recording circuit is disabled so that an increase in the gain of the automatic gain control means will not be operative to effect recording of the signal. Means such as a discharge tube 16 is provided to reset the circuit upon the occurrence of a positive pip and permit printing of the first maximum signal impulse. Preferably the time delay means 17 is provided to prevent the negative pips from disabling the print circuit until the white or minimum signal has persisted for a predetermined time, say one second, or less than the time constant of the AGC.

Figs. 2 and 3 of the drawings illustrate a detailed circuit diagram of the automatic gain control or compensating system embodying the invention. Referring to these figures of the drawings, the input signals received from the remote facsimile transmitter are impressed upon the automatic gain control amplifier 10. The output of the amplifier 10 is further amplified in the triode 21 and rectified by the full wave rectifier 22 to obtain a bias potential which is impressed upon the control grid of the amplifier 10 to regulate the amplification of the signal in accordance with the level in the usual manner. The output of the automatic gain control system is impressed through the conductor 11 upon the amplifier 39 for the print circuit containing the recording element or stylus of the facsimile recorder. Upon the occurrence of a minimum signal of considerable duration, the amplification will build up and, depending upon the time constant of the gain control system, the signal level would gradually increase to the point where the recorder would commence to record on the minimum level. To prevent this, in accordance with the invention, the print circuit is disabled upon the occurrence of a minimum signal of predetermined duration.

The amplified output signal from the gain control system is rectified in a second full-wave rectifier 25, filtered in a low pass filter 26, and further amplified if necessary. The signal then passes the differentiating means comprising a capacitor 29 and a resistor 30. The triodes 31 and 32 are connected as in the conventional flip-flop Eccles-Jordan circuit.

On the minimum or negative pulse, the tube 31 of the flip-flop circuit is cut off, making the point 33 positive. A capacitor 34 starts to charge through a resistor 35 and causes the gas-filled tubes 36 and 37 to break down when a predetermined positive potential is reached on capacitor 34. This raises the potential of the grid of a tube 38 from zero to some high value. Since the tube 38 is effectively a cathode follower (since resistor 44 is about 500 ohms), the potential at the cathode of 38 will also increase to a high value. The increase in potential at the junction of resistors 41 and 42 biases tubes 39 and 40 beyond plate current cut off and thereby prevents any signal at the grid of 39 from appearing at the print circuit.

The tubes 39 and 40, a push-pull amplifier for these switching signals, eliminate the switching transients from the print circuit. Since both tubes are cut off at the same time, the transients developed at each plate are in phase and hence do not appear at the output. The potentiometer 43 in the cathode circuit of tubes 39 and 40 is used to balance the gain of the stages. When the tube 38 becomes conductive on the recurrence of the maximum signal after a long interval of minimum signal, a small pulse which may be adjusted by setting the variable resistor 44 is impressed upon the print amplifier 40. This insures printing of the first maximum signal pulse.

When the signal level changes from minimum to maximum the positive pip from the differentiating circuit fires the tube 31 and cuts off the tube 32 of the flip-flop circuit. A current impulse is applied to the control grid of the gas-filled tube 16 and the tube fires, thus discharging the capacitor 34 and extinguishing the tubes 36 and 37. The tube 38 is returned to normal bias and removes the cut off bias on tubes 39 and 40. Thus the print circuit is again rendered operative to record the facsimile signal.

From the foregoing description of a preferred embodiment of the invention, it will be apparent that the gain control system has a number of advantages particularly for facsimile recording. With this simple arrangement, the time constant of the gain control element may be fairly fast without any risk of printing on the minimum signal. No involved timing means or comparison circuits are employed. In the specification and claims, it should be understood that the term "minimum signal" includes absence of signal when the minimum signal level is zero.

While as described the maximum signal level corresponds to black, it is obvious that the signal may be inverted so that black is recorded on minimum signal level. In this case, the print circuit is disabled upon the transition from minimum to maximum level. The polarity of the control pips is reversed with respect to the flip-flop circuit, the arrangement being equivalent to and operating in the same manner as that shown and described above.

Various modifications in the system shown and described will occur to those skilled in the art and may be made without departing from the scope of the invention as defined in the appended claims.

I claim:

1. In a facsimile recorder for message recording on marking and spacing signals only, an input circuit and a print circuit, variable gain amplifying means connected between said circuits to maintain substantially constant marking signal level in the print circuit irrespective of changes in input signal level, means connected to the said input circuit for generating pips of current as the marking and spacing signals in said circuit change from minimum to maximum and vice versa, means connected to the print circuit for disabling said print circuit and means connected to said pip-current generating means for operating said disabling means in response to the pips occurring at the beginning of said spacing signals.

2. In a facsimile recorder for message recording on marking and spacing signals only, an input circuit and a recording circuit, an amplifier between said input circuit and said recording circuit, said amplifier including automatic gain control means for maintaining substantially constant maximum marking signal level in the recording circuit irrespective of changes in the input signal level, means connected to said input circuit for generating pips of current as said signals change from maximum to minimum, means connected to the recording circuit for disabling said recording circuit and means connected to said pip-current generating means and responsive of said pips of current for operating said disabling means upon the occurrence of said minimum signals, thereby preventing the printing of minimum level signals when the automatic gain control means increases the gain of said amplifier during the reception of such minimum signals.

3. In a facsimile recorder for message recording on marking and spacing signals only, an input circuit and a print circuit, means connected to said input and print circuits for energizing said print circuit in accordance with the marking signals in said input circuit, said means including an amplifier connected to said input circuit, means connected to said amplifier for rectifying the signals to produce pips of current upon the transition from marking to spacing signal and vice versa, means connected to the print circuit to disable said print circuit and means connected to said rectifying means responsive to said pips of current to activate said print-circuit disabling means upon the transition from marking to spacing signal and to reactivate said print circuit upon the transition from spacing to marking signal.

4. In a facsimile recorder for message recording on marking and spacing signals only, an input circuit and a print circuit, means connected to said input and print circuits for energizing said print circuit in accordance with the marking signals in said input circuit, said means including an amplifier connected to said input circuit, means connected to said amplifier for rectifying said signals to produce pips of current upon the transition from marking to spacing signal, a grid-controlled amplifier in said print circuit and grid-biasing means connected to said rectifying means to bias said print-circuit amplifier to cutoff in response to said pips of current.

5. In a facsimile recorder for message recording on marking and spacing signals only, an input circuit and a print circuit, variable gain amplifying means connected between said input circuit and said print circuit, said amplifying means embodying automatic gain control means for maintaining the marking signal level in said print circuit substantially constant irrespective of changes in the input marking signal level, means connected to said input circuit for rectifying the input signals to produce pips of current upon the transition from marking or maximum to spacing or minimum signal and vice versa, means connected to said signal rectifying means and to said print circuit to disable the print circuit in response to said marking-to-spacing pips of current and to reactivate the print circuit upon subsequent recurrence of the marking or maximum signal.

6. In a facsimile recorder for message recording on marking and spacing signals only, an input circuit and a print circuit, an amplifier in each of said circuits and connected in series relation, automatic gain control means connected to said input-circuit amplifier for compensating for changes in the signal level in the input circuit, means connected to said input-circuit amplifier for detecting the transition from marking or maximum signal to spacing or minimum signal and vice versa, and means responsive to said transition detecting means and connected to said print-circuit amplifier for biasing said print-circuit amplifier to cutoff during a spacing signal of predetermined duration and until the subsequent occurrence of marking signal level.

7. In a facsimile recorder for message recording on marking and spacing signals only, an input circuit and a print circuit, an amplifier in each of said circuits and connected in series relation, automatic gain control means connected to said input-circuit amplifier for varying its gain to compensate for changes in signal level in the input circuit, means connected to said input-circuit amplifier for detecting the transition from marking or maximum signal to spacing or minimum signal and vice versa, a gas-filled tube connected to said signal detecting means, said tube becoming electrically conducting when the applied voltage reaches a critical value, and means connected to said print-circuit amplifier and including said signal detecting means and said gas-filled tube for rendering the print-circuit amplifier non-conductive.

8. In a facsimile recorder for message recording on marking and spacing signals only, an input circuit and a print circuit, a variable gain amplifier embodying automatic gain control means connected to said circuits to maintain substantially constant marking signal level in said print circuit, and means connected to said input and print circuits and responsive to the received signals for disabling said print circuit when a minimum or spacing signal of predetermined duration is received and to reactivate said print circuit upon the subsequent occurrence of a maximum or marking signal, said last-mentioned means including time-delay means to predetermine the duration of the spacing signal which is effective to operate said disabling means.

References Cited in the file of this patent

UNITED STATES PATENTS

| | | |
|---|---|---|
| 2,028,859 | Barton | Jan. 28, 1936 |
| 2,223,431 | Smith | Dec. 3, 1940 |
| 2,672,504 | Grimes | Mar. 16, 1954 |
| 2,679,000 | Reynolds | May 18, 1954 |